Sept. 7, 1943.   T. E. BOSWORTH   2,329,031
OPHTHALMIC MOUNTING
Filed Sept. 7, 1939
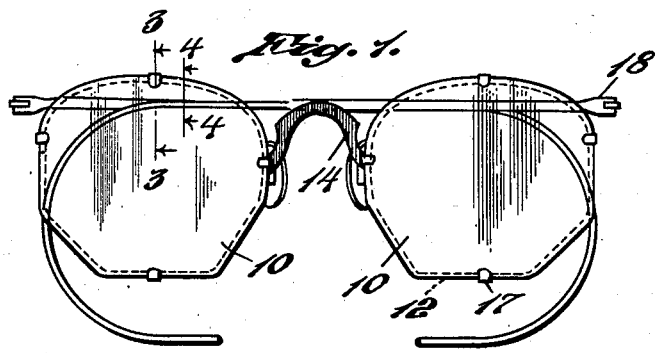
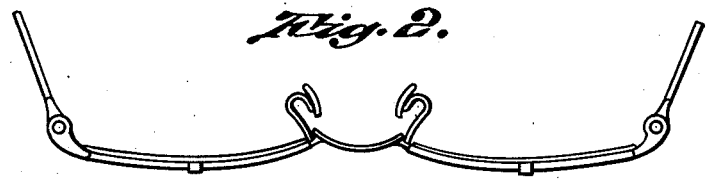
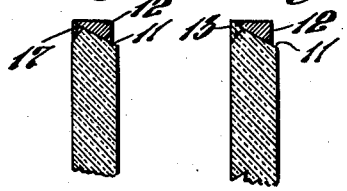
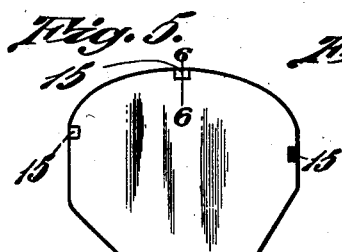
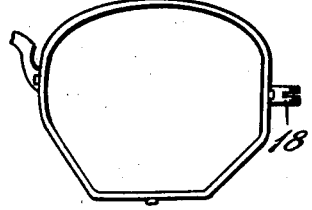
INVENTOR.
Thomas E. Bosworth
BY Barlow & Barlow
ATTORNEYS.

Patented Sept. 7, 1943

2,329,031

UNITED STATES PATENT OFFICE 2,329,031

OPHTHALMIC MOUNTING

Thomas E. Bosworth, Cranston, R. I., assignor, by mesne assignments, to George P. Kimmel, Brookeville, Md.

Application September 7, 1939, Serial No. 293,667

9 Claims. (Cl. 88—47)

This invention relates to an ophthalmic mounting and has for one of its objects to provide a support for the lens which will make unnecessary the placing of a hole in the lens and the use of the so-called strap to secure the lens in position.

Another object of the invention is to provide a mounting for a lens which, altho it has a rim extending about the edge of the lens, is so formed and shaped that the rim is inconspicuous and will not be noticed and the appearance of a rimless mounting will be had.

Another object of the invention is to provide an arrangement whereby the temples may be mounted in any desired location without material change of the structure of the device.

A further object of the invention is to so bevel the edge of the lens that it will hide the rim mounted about the edge of the lens.

With these and other objects in view, the invention consists of certain novel features of construction, as will be more fully described, and particularly pointed out in the appended claims.

Fig. 1 is a face view of spectacles equipped with my invention.

Fig. 2 is a top plan view.

Fig. 3 is a section on line 3—3 of Fig. 1.

Fig. 4 is a section on line 4—4 of Fig. 1.

Fig. 5 is a face view of a lens showing notches in the edge of the front face thereof.

Fig. 6 is a section on substantially line 6—6 of Fig. 5.

Fig. 7 is a rear view of the rim.

Fig. 8 is a fragmentary view showing a portion of the rim with a different temple joint mounting.

In some ophthalmic mountings, a rim about the lens is undesirable, and the mounting requires that an opening be pierced through the lens and a strap used for mounting the lens on a bridge or a temple on the lens. Piercing of a lens in this manner is undesirable as strains upon the lens frequently cause breakage or drilling the lens causes breakage. A manner of mounting which requires only one opening in the lens at the bridge is that of providing a curved bar extending along the upper edge of the lens just back of the lens edge for the mounting of a temple and hiding the bar. I have provided a mounting which is stronger than either one of these two and yet one in which, although there is a rim which extends about the edge of the lens, the lens is so beveled to receive the rim that when the rim is placed along the bevel of the lens the rim is inconspicuous and non-objectionable, and the following is a more detailed description of the present embodiment of this invention, illustrating the preferred means by which these advantageous results may be accomplished:

With reference to the drawings, 10 designates each of two lenses which are beveled as at 11 about their peripheral edges. A rim 12 is located along the bevel 11 so as to be substantially hidden by the upper corner 13 of the edge of the lens. (Note Fig. 4.) This rim is generally triangular in cross section and is suitably secured to a bridge 14 to hold the two rims in desired relative position, while the rim is secured to the lens by reason of notches 15 at intervals in the edge of the lens, the number necessary being dependent upon the shape of the lens, with a finger 17 secured to the edge of the rim and bent into the notch (see Fig. 3). The bevel of the edge of the lens which will be less than 45° prevents sight of the rim 12 which is located along the back of this bevel, the lens being held securely in place by reason of the fingers 17 and mounted securely upon the bridge by soldering of the rim to the bridge at the ends thereof.

Mountings for the temples 18 may be at any point along the rim, the mounting being shown in a high position in Fig. 1, a low position in Fig. 7 and in an intermediate position in Fig. 8. This temple mounting may be secured in position by soldering the temple joint to the rim.

From the foregoing it will be apparent that the bevel of the lens which is formed on most every lens is utilized to hide the largest portion of the rim, means being provided for extending the rim by means of fingers for sufficiently gripping part of the material of the lens on the opposite side for holding the same in position. No opening need be provided through the lens for the mounting of the lens in position nor for securing the lens to the bridge or the temples, the bridge and temples being secured to metal parts and located at any desired height along the edge which may be chosen, no modification of this rim structure being necessary for this temple joint mounting.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a pair of spectacles or the like, a pair of lenses each having an edge thereof beveled and with the bevel inclining inwardly from the front face to the rear face of the lens, each lens being formed in its outer face with spaced recesses, a pair of lens holders having beveled face parts, said parts being cooperatively related to and seated on the bevels of said lenses, and said holders having bendable finger-like portions engageable in said recesses for securing said holders and lenses together, the exposed front surface of each finger-like portion being substantially flush with the front surface of a lens so as not to protrude outwardly therefrom.

2. In a pair of spectacles or the like, a pair of lenses each having its edge beveled and with the bevel inclining inwardly, each lens being formed in its outer periphery with spaced recesses, a pair of connected together lens holders having their inner faces beveled and with the bevels inclining inwardly from the fronts of the holders and seated on the bevels of the lenses, and spaced securing means for the holders and lenses, said securing means being integral with the fronts of the holders and bendable at an angle thereto within said recesses whereby to secure the lenses and holders together, the exposed front surface of each said securing means being substantially flush with the front surface of a lens so as not to protrude outwardly therefrom.

3. In a pair of spectacles or the like, a pair of imperforate lenses each having a beveled edge and its outer face formed with spaced recesses opening at such edge, a pair of connected together lens holders having their inner faces beveled, said inner faces of said holders being seated against said beveled edges, and spaced securing means for the holders and lenses, said securing means being integral with the fronts of the holders, disposed inwardly at right angles to said fronts and engaged in said recesses whereby to secure the lenses and holders together, the exposed front surface of each said securing means being substantially flush with the outer face of the lens so as not to protrude outwardly therefrom.

4. In a pair of spectacles or the like, a pair of imperforate lenses each having an inwardly beveled edge and its outer face formed with spaced recesses opening at said edge, a mounting including a pair of lens holders, a bridge, nose pads and temples, each of said holders having their inner faces inwardly beveled, the inner faces of said holders being seated against said beveled edges, and spaced securing means for connecting each lens to the mounting, said securing means being integral with the fronts of the holders, disposed inwardly at an angle to said fronts and engaged in said recesses, the exposed front surface of each said securing means being substantially flush with the outer face of the lens so as not to protrude outwardly therefrom.

5. In a pair of spectacles or the like, a pair of lenses each having its edge beveled throughout, the bevel inclining inwardly from the front to the rear face thereof, each of said lenses having the marginal portion of its front face formed with spaced recesses opening at its edge, a pair of lens rim members having beveled inner faces inclining inwardly from front to rear and seated upon the beveled edges of the lenses, and said members being formed at their fronts with bendable fingers engaging in said recesses for securing said members and lenses together, the said bendable fingers being substantially flush with the front surfaces of the lenses so as not to protrude outwardly therefrom.

6. In spectacles, eyeglasses and the like, a pair of eyewires, a nose bridge connecting said eyewires at the nasal sides thereof, nose pad arms extending rearwardly from said eyewires at the nasal sides thereof, nose pads mounted on said arms, and a pair of lenses, said eyewires corresponding in general contour to the contour of said lenses, and positioned wholly within the circumferential limits of said lenses, rearwardly thereof, said lenses having front and rear surfaces respectively and the fronts of the lenses being of greater area than the rears thereof, the lenses being provided peripherally with a bevel, said eyewires each being substantially right-triangular in cross section and having the hypotenuse side corresponding to the angle of the bevel on the lenses, each lens being provided with spaced notches and each eyewire having spaced fingers for engaging in said notches, the bottom walls of said respective notches each being inclined and the fingers each having correspondingly shaped inclined walls, the exposed front surface of each finger being substantially flush with the front surface of the lens so as not to protrude outwardly therefrom, the said fingers serving to connect said lenses with said eyewires.

7. In combination, in a pair of spectacles of the concealed rim type, a pair of lenses, a pair of eyewires, a nose bridge, endpieces, rearwardly offset guard arms for carrying a pair of nose pads, and a pair of nose pads, said lenses each having front and rear surfaces, top, bottom, nasal and temporal side portions, the marginal edge of each lens being formed with a bevel whereby the lens is caused to have a greater area as to its front surface than the rear surface, and each lens having notches formed therein at spaced intervals around its periphery, said notches each having side walls and a lower inclined wall; said eyewires corresponding substantially in contour to said lenses, each being triangular in cross section and having one side corresponding to the angle of the bevel on said lenses, and each eyewire being formed at the forward edge thereof with spaced fingers engaging in said notches and corresponding in shape therewith, each of the said fingers having a front surface substantially flush with the front surface of a lens.

8. In spectacles, eyeglasses, and the like, of the type including eyewires, a bridge connecting the eyewires, and a pair of lenses, a pair of eyewires substantially right-triangular in cross section, having a series of spaced fingers extending downwardly from the front edges thereof, for engaging with and holding the lenses in place, and a pair of lenses each having a circumferentially beveled edge and a series of spaced notches for engagement with the said fingers, the front edge of each eyewire being substantially flush with the front edge of a lens and the respective fingers having their front surfaces substantially flush with the front surface of the lens when engaged therewith.

9. In a pair of spectacles or the like, a pair of lenses each having an edge thereof beveled, the said beveled edge inclining inwardly from the front to the rear of the lens, the lenses being provided in their edges with recesses, a pair of lens holders having parts bearing against the said lens bevels, and said holders having bendable finger-like portions each engageable substantially entirely in a said recess for securing said holders and lenses together.

THOMAS E. BOSWORTH.